United States Patent
Henderson

(10) Patent No.: US 6,435,100 B1
(45) Date of Patent: Aug. 20, 2002

(54) MACHINE FOR TRANSPORT OF PASSENGERS AND CARGO

(76) Inventor: J. Kirston Henderson, 1709 Ridgmar Blvd., Fort Worth, TX (US) 76119

(*) Notice: Subject to any disclaimer, the term of this patent is extended or adjusted under 35 U.S.C. 154(b) by 0 days.

(21) Appl. No.: 09/927,519

(22) Filed: Aug. 10, 2001

Related U.S. Application Data

(60) Division of application No. 09/475,867, filed on Dec. 30, 1999, which is a continuation-in-part of application No. 08/921,180, filed on Aug. 29, 1997, now Pat. No. 6,039,135.
(60) Provisional application No. 60/025,451, filed on Sep. 5, 1996.

(51) Int. Cl.$^7$ .............................................. B61B 12/00
(52) U.S. Cl. ........................ 104/242; 104/124; 104/140; 104/139; 105/72.2; 191/23 R
(58) Field of Search ............................... 104/27, 28, 29, 104/30, 31, 48, 88.01, 88.02, 88.03, 88.04, 90, 95, 124, 139, 140, 142, 242, 243, 108, 109; 105/154, 159, 172, 215.1, 215.2; 414/396, 401; 191/23 R, 29 R, 31, 49; 410/3, 4

(56) References Cited

U.S. PATENT DOCUMENTS

| | | | | |
|---|---|---|---|---|
| 1,611,882 A | * | 12/1926 | Budd | 104/27 |
| 2,022,376 A | * | 11/1935 | Judd | 410/4 |
| 2,709,410 A | * | 5/1955 | Fenton | 104/27 |
| 3,570,407 A | | 3/1971 | Burch | |
| 3,637,956 A | | 1/1972 | Blackman | |
| 4,129,203 A | | 12/1978 | Berman | |
| 4,449,600 A | | 5/1984 | Telfer | |
| 4,476,947 A | | 10/1984 | Rynbrandt | |
| 4,776,282 A | * | 10/1988 | Ishikura et al. | 104/109 |
| 4,791,871 A | | 12/1988 | Mowll | |
| 5,148,751 A | * | 9/1992 | Alten et al. | 104/31 |
| 5,199,358 A | | 4/1993 | Barratt | |
| 5,464,243 A | | 11/1995 | Maiwald | |
| 5,590,603 A | * | 1/1997 | Lund | 104/88.04 |
| 5,706,735 A | * | 1/1998 | Lund | 104/88.04 |
| 5,755,125 A | | 5/1998 | Charrette | |
| 5,775,227 A | * | 7/1998 | Mullen | 104/88.04 |
| 5,795,115 A | | 8/1998 | Collins | |

OTHER PUBLICATIONS

"RUF Personal Rapid Transit Technology Overview" from Washington University Web Page on Personal Rapid Transit (No date).

* cited by examiner

Primary Examiner—Mark T. Le
(74) Attorney, Agent, or Firm—Bracewell & Patterson, L.L.P.

(57) ABSTRACT

An electrically powered vehicle transportation system utilizes a guideway with parallel enclosed rails. Each enclosed rail has an electrical bus bar for supplying power to vehicles on the guideway. The guideway will accommodate dual-mode vehicles that are capable of usage on conventional streets as well as on the guideway. The guideway also accommodates conventional vehicles and ferries that operate only on the guideway. The dual-mode vehicle has a body with axles that are extensible. The axles move from a retracted position, with the wheels recessed within the wheel wells, to an extended position. In the extended position, the wheels locate within the enclosed rails. Conventional vehicles and freight are carried on ferries that move along the guideways.

10 Claims, 10 Drawing Sheets

MACHINE FOR TRANSPORT OF PASSENGERS AND CARGO

RELATED APPLICATIONS

This application is a divisional of Ser. No. 09/475,867, filed Nov. 30, 1999, which was a continuation-in-part of application Ser. No. 08/921,180, filed Aug. 29, 1997, now U.S. Pat. No. 6,039,135, which claimed priority to provisional application No. 60/025,451, filed Sep. 5, 1996.

TECHNICAL FIELD

This invention relates in general to mass transportation devices and in particular to a mass transportation system including a guideway and vehicles capable of use both on conventional roadways and the guideway of the mass transportation system.

BACKGROUND ART

Mass transportation systems have been developed and proposed for a variety of transportation vehicles. In one, the system uses vehicles that are carried by a cable or track and which stop for passenger or cargo pick-up and drop-off automatically upon demand. The demand is made known to the system by either human input of some type or computer program. Such systems have been used and proposed for use in high traffic density situations. These systems have been designed for relatively low-speed operations and for relatively short distance applications such as within airports and in downtown areas. Vehicles for such systems have been carried on tracks or guideways. Switching of vehicles from track to track or guideway to guideway has generally been accomplished by employing movable track or guideway elements.

Vehicles designed for such use may be used only on the tracks or guideways for which they are designed. Use of the tracks or guideways is also restricted to system captive vehicles designed only for track or guideway use. Some limited-use vehicles have been designed for dual road and track use under manual control. Examples of such a vehicle are normal road use trucks equipped with separate wheels to allow them to be driven by railroad maintenance personnel along railroad tracks under manual control. Some normal road-use motor vehicles have been adapted with either mechanical steering arms designed to cause the car to follow a steering rail mounted along a special roadway, or electronic sensors designed to cause the car to follow magnets or electrified wires embedded in road pavement. Several disadvantages are inherent in these past systems, including the following:

1. Some of the systems are capable of providing service only between stations and are incapable of providing door-to-door service to passengers and cargo.
2. Systems designed to allow specially equipped motor vehicles to operate on automated guideways have not provided on-demand or scheduled station-to-station service for non-motor vehicle passengers.
3. Inability to provide door-to-door service for passengers and cargo greatly restricts the usefulness of station-to-station systems that use track or guideway only vehicles.

Provision of such systems makes it necessary to employ other means such as conventional motor vehicles or trucks either instead of or in addition to the system. Such motor vehicles and trucks cause pollution of the atmosphere and require expensive and usually parallel networks of roads and highways.

4. In order to enable operation under the full range of weather conditions, track or guideway based systems must either be located in expensive tunnels or completely covered.
5. Trackways or guideways for past systems have been expensive to build because of needs to provide extensive land grading or massive structural supports for heavy elevated trackways or guideways.
6. Because past automated track or guideway based systems have been designed for relatively short range or low speed operations, they have not been practical for high-speed, long-distance operation. Thus, it is necessary to transfer passengers and cargo between vehicles for transportation over other than relatively short distances.
7. Because of items (1) and (6) above, past rail or guideway based systems using captive vehicles have not provided capability for long-distance, door-to-door service for passengers or cargo.
8. Individual passenger security and privacy are not provided during travel in systems in which relatively large vehicles are used.
9. Automatic point-to-point transportation of cargo is not provided via the same systems providing passenger travel.
10. Systems capable of providing station-to-station passenger service have been unable to accommodate dual mode road use and trackway or guideway use vehicles.

Another system uses special railroad cars equipped with wheel ramps arranged to allow motor vehicles to be driven onto and off of the railroad car for transport. Such cars and ramps are designed to carry several motor vehicles over conventional railroads. Ramps are also used at loading and unloading points to allow the cars to be driven onto and off of the rail cars. This system has several disadvantages, including the following:

1. The railroad cars are designed to carry a multiplicity of empty motor vehicles rather than one motor vehicle with passengers.
2. The special railroad cars are designed to operate on conventional railroads rather than on an automated guideway.
3. The ramps for entry and exit of motor vehicles to the railroad cars are not designed to allow empty railroad cars designed to transport motor vehicles to pass freely under the entry and exit ramps to reach and leave the motor vehicle loading position.
4. The railroad cars are designed to be pulled by conventional railroad engines as parts of conventional railroad trains rather than operating alone under automated control under their own power and control on an automated guideway system.

Still another system proposed makes use of dual mode cars for both conventional road and guideway use. This dual mode car is conveyed by a monorail and has a set of separate street wheels for street use. This car has a wide, lengthwise section down the center of the car to accommodate the monorail and can only fit passengers on either side of the car. The monorail drive wheels are complex.

What is needed is a single system for rapid and efficient transportation of passengers and cargo both on a door-to-door and station-to-station basis for either short range or long-distance.

DISCLOSURE OF INVENTION

This invention relates to a set of machines for automated transportation of passengers and cargo along special guideways, and for nonautomated transportation of passengers and cargo on conventional streets and roads with provisions for use of the same vehicles for both guideway and road applications and without transfer of passengers or cargo between vehicles when transferring between roads and guideways. The guideway has a pair of rails enclosed by a shroud. A slot extends longitudinally through an inner side wall of each of the shrouds. The vehicle wheels are carried within the shroud on wheel contacting surfaces, with ends of the axles extending through the slots. An electrical bus bar is located within the shroud for providing power to the vehicle. A communication strip is located within the shroud for transmitting to and receiving signals from the vehicle.

The dual-mode vehicles of this invention have axles that are extensible from a retracted position to an extended position. In the extended position, the wheels will locate within the enclosed rails. In the retracted position, the wheels recess within wheel wells of the vehicle for conventional street use. Other vehicles of this invention are dedicated for use only on the guideway. Conventional vehicles may also be used on the guideway by loading them on automated ferries that move along the guideway.

Both dual-mode and guideway only vehicles are automatically controlled during guideway use. The vehicles and guideways are designed to provide protection from weather elements including snow, sleet, ice, and rain accumulation that would interfere with operation of the vehicles on the guideways. The design of the vehicles and guideways are such that switching of vehicles between guideways and on and off of the guideways is accomplished without discontinuities or moving parts in either the guideways or the guideway switching mechanisms.

The automated car ferry vehicle is designed to hold and carry a single conventional motor vehicle with passengers on the tracked automated transportation system. The system also has special ramps for loading and unloading the motor vehicles onto the ferries from conventional streets and roads. A cargo version of the ferry is adapted to carry conventional sea-land cargo containers.

BEST MODE FOR CARRYING OUT THE INVENTION

Figure 1:
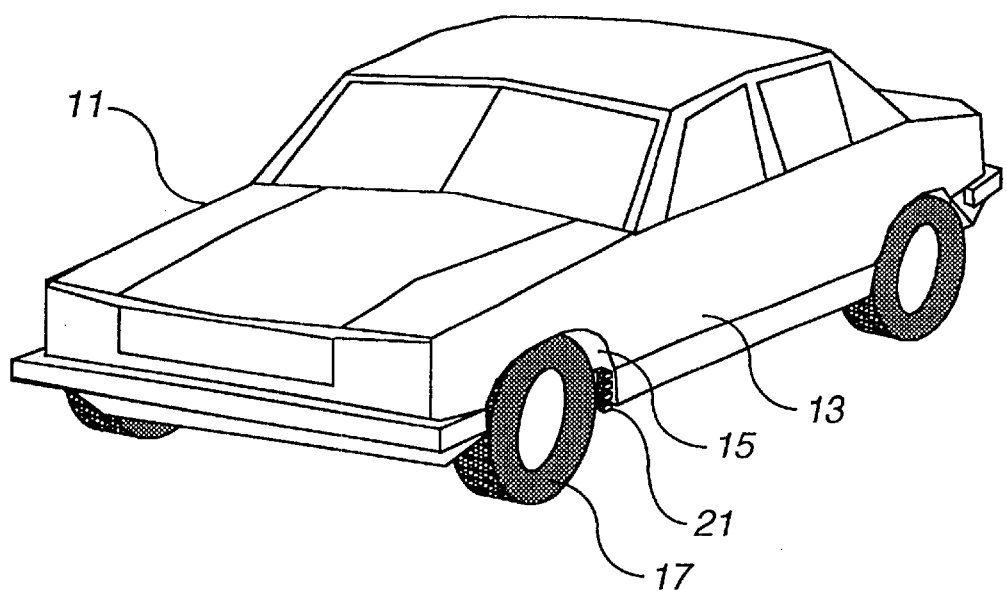
FIG. 1 is a perspective view of a dual-mode vehicle constructed in accordance of this invention and shown with the wheels in a retracted position.

Referring to FIG. 1, a dual-mode vehicle 11 is constructed for use on conventional roads and also for use on an automated guideway system. Vehicle 11 has a body 13 with four wheel wells 15. Wheels 17 are recessed as shown in FIG. 1 for conventional road use. Wheels 17 are extensible to the position shown in FIG. 2 for use on the automated guideway system of this invention.

Figure 7:
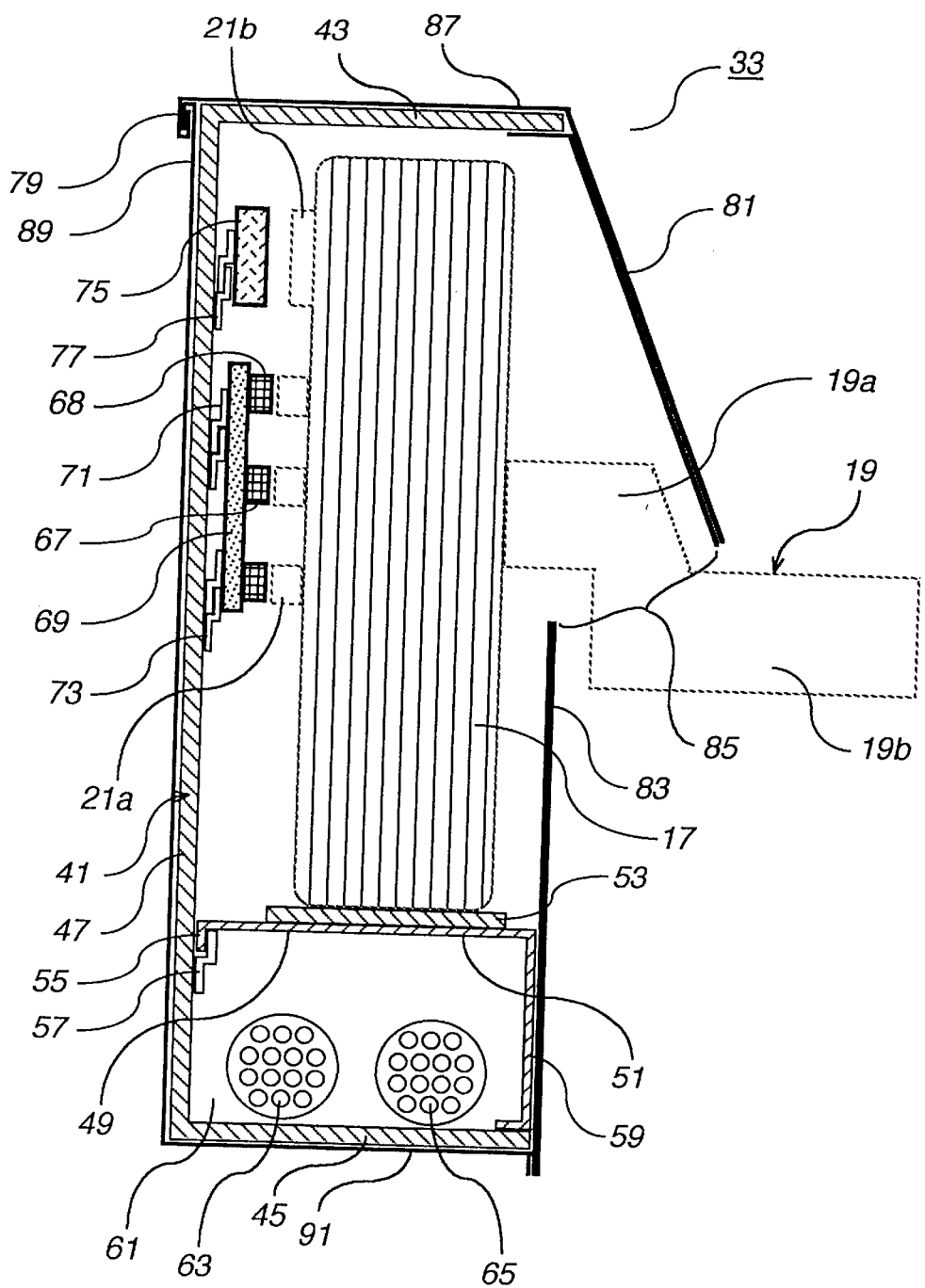
FIG. 7 is an enlarge sectional view of one of the rails of the guideway of FIG. 4, with one of the vehicle of FIG. 1 shown therein.

Referring to FIG. 7, wheels 17 are supported on axles 19. Each axle 19 is extensible from the retracted position shown in FIG. 1 to the extended position shown in FIG. 2. The extension and retraction may be accommodated in several manners. Preferably the mechanism will include telescoping members that are moved between the two positions by hydraulic cylinders (not shown). Also, each axle has a hub end 19a that is offset and higher than a central portion 19b. The axis of rotation of central portion 19b will be located below the axis of rotation of wheel 17 and hub end 19a.

Figure 2:
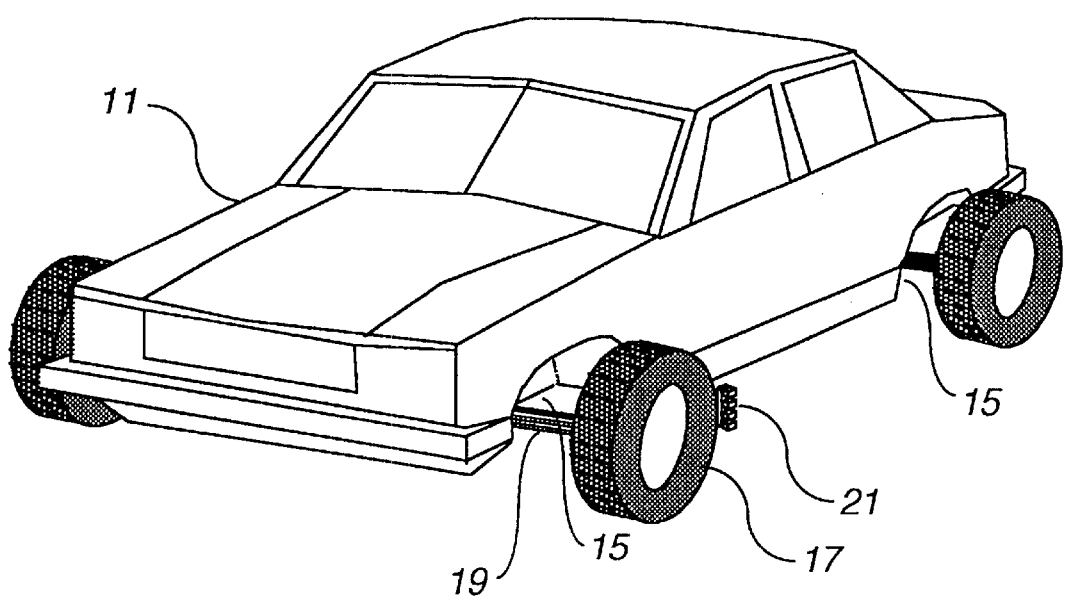
FIG. 2 is a perspective view of the vehicle of FIG. 1, showing the wheels in an extended position.

Referring again to FIGS. 1 and 2, vehicle 11 also has a set of electrical power and communication devices 21 mounted on each side adjacent to the front wheel 17. Electrical devices 21 also move between extended and retracted position as shown in FIGS. 1 and 2. Electrical devices 21 will recess within one of the wheel wells 15 while in the retracted position. In the extended position, electrical devices 21 extend out to the outer edge of wheel 17 for receiving power and communicating with the automated guidance system. As shown schematically in FIG. 7, electrical devices include three power conductors 21a and a communication device 21b, such as an antenna or an optical signal transmitter/receiver.

Figure 5:
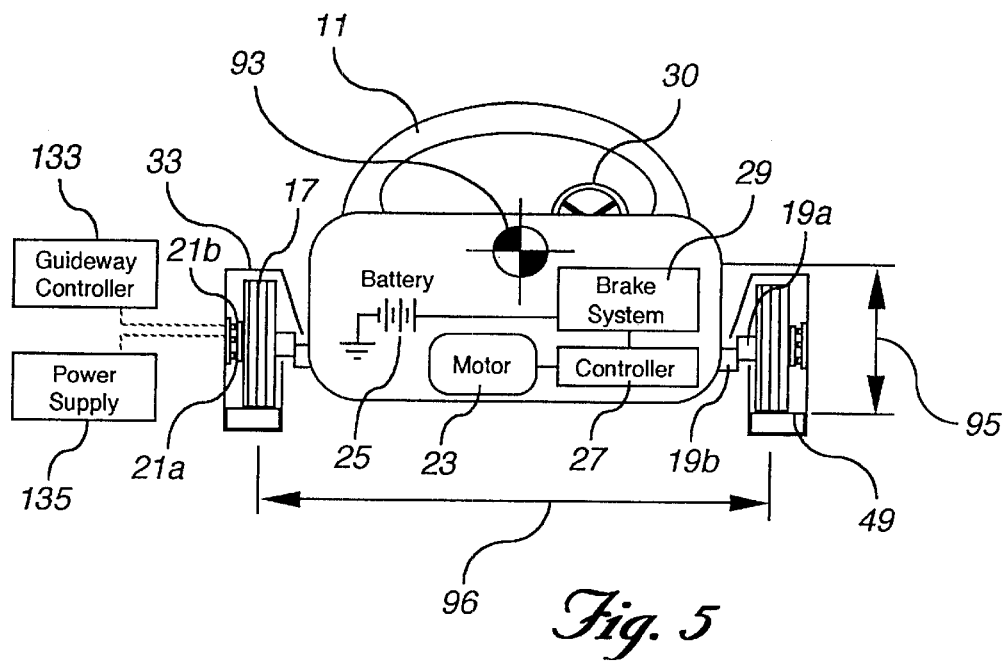
FIG. 5 schematic view of the vehicle of FIG. 1 and the guideway of FIG. 3, the guideway begin shown in cross-section.

Referring to FIG. 5, dual-mode vehicle 11 has an electrical motor 23, shown schematically. Motor 23 supplies the power to drive wheels 17 both while on conventional roadways and also on the automated guideway. While on conventional roads, a series of batteries 25 provide power for motor 23. A controller 27 controls the speed of motor 23 through a transmission (not shown). Controller 27 also controls a brake system 29. For conventional roads, a throttle pedal (not shown) will be used by the driver to control controller 27, and a brake pedal (not shown) will be used to control the brake system 29. Furthermore, a steering wheel 30 is employed on conventional roads for turning front wheels 17. On the automated transport system, controller 27 cuts off power from batteries 25 and power from the automated system will be supplied to motor 23. Furthermore, signals from the automated guideway system will operate the brake system 29 and steering system 30 through the electrical devices 21.

Figure 3:
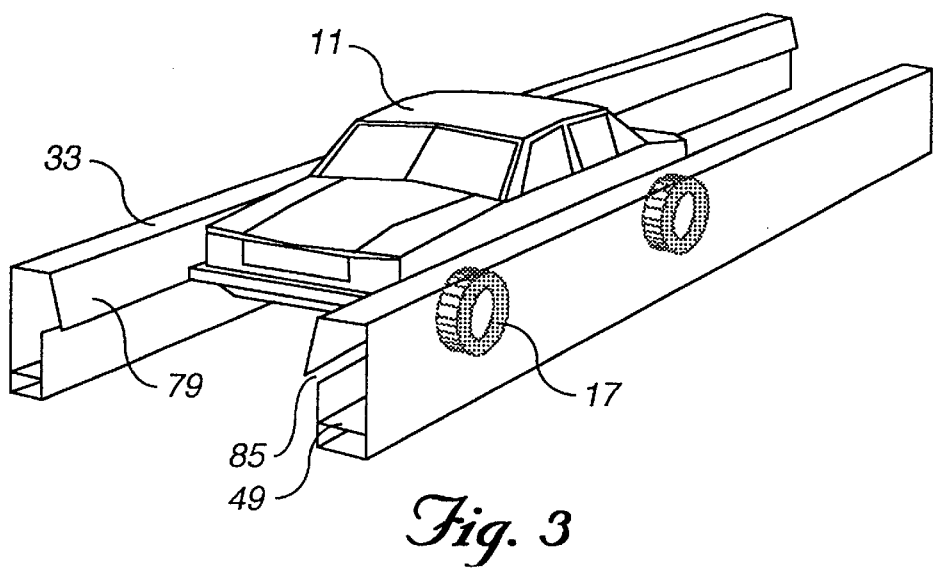
FIG. 3 is a perspective view the vehicle of FIG. 1 shown within a guideway constructed in accordance with this invention.
Figure 4:
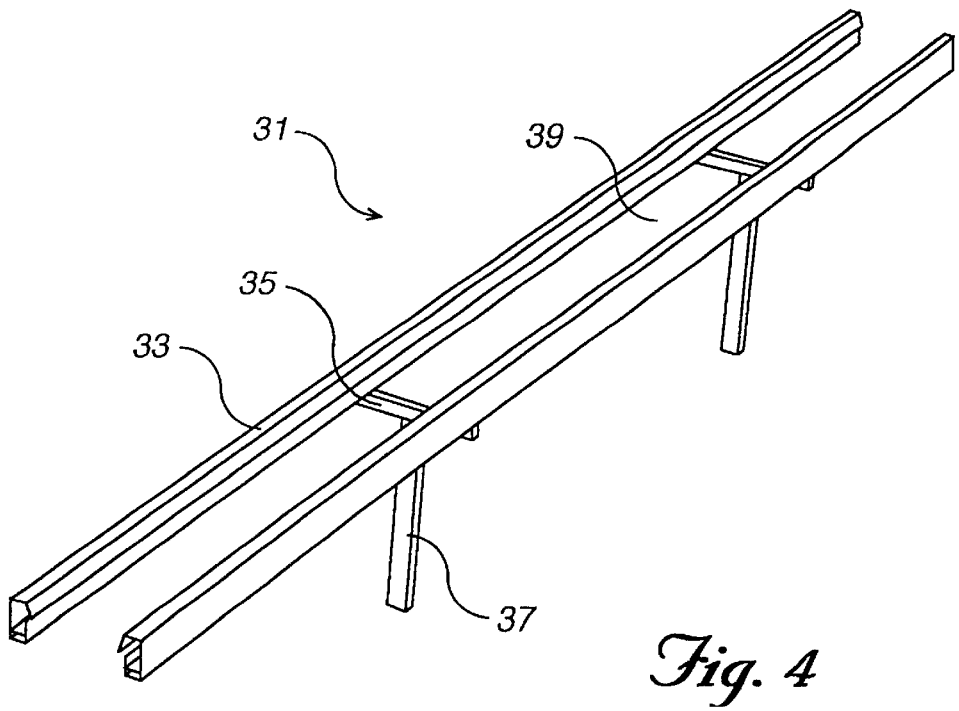
FIG. 4 is a perspective view of the guideway shown in FIG. 3.

FIGS. 3 and 4 illustrate guideway 31 of the automated system. Guideway 31 comprises a pair of parallel rails 33. Rails 33 are supported by cross members 35, which in turn are mounted to posts 37. The spaces 39 between rails 33 and between cross members 35 are open to allow sunlight to pass through to the ground. The longitudinal distance from one cross member 35 to another is substantially greater than the width from one rail 33 to another. As shown in FIG. 3, wheels 17 of dual-mode vehicle 11 will locate within each of the rails 33.

Referring again to FIG. 7, each rail 33 has a main support member that is a channel member 41. Channel member 41 is preferably steel and has upper and lower flanges 43, 45 and a sidewall 47. Flanges 43, 45 are parallel to each other and perpendicular to sidewall 47. Sidewall 47 is located on the outer side with flanges 43, 45 extending inward.

A support member 49 mounts to channel member 41 for providing support to wheels 17. Support member 49 has a flat base 51 with a tread or track 53 located on top. Base 51 has a depending lip 55 on its outer side. Lip 55 fits within a slot provided by a bracket 57 mounted to the inner side of sidewall 47. Support member 49 has a depending leg 59 that extends from the inner edge of base 51 downward into engagement with channel member lower flange 45. Support member 49 can be readily removed by pulling lip 55 upward from bracket 57.

Support member 49 defines a chamber 61 between it and lower flange 45. Power cables 63 for supplying power extend through chamber 61. Also, communication or signal cables 65 extend through chamber 61. Power cable 63 and communication cables 65 could be joined in a single cable, if desired. Power cable 63 communicates with a power bus bar 67. Also, in addition to communication cables 65 for control of vehicles on guideway 11, space exists for telecommunication cables for general purpose use, independent of guideway 11. In this embodiment, three separate longitudinally extending conductors 68 make up bus bar 67, because the preferred power supply is three-phase AC. Each of the conductors 68 is mounted to an insulator 69. Insulator 69 secures to the interior of sidewall 47 by means of clips 71. Clips 71 locate within a bracket 73 secured to sidewall 47. Conductors 68 are adapted to be slidingly engaged by the three power contacts 21a mounted to dual-mode vehicle 11 (FIG. 1). Each contact 21a has a spring within it that biases it laterally outward into sliding contact with one of the conductors 68.

Communication cable 65 is connected to a longitudinal communication array or strip 75. Communication strip 75 might be an antenna for electromagnetic transmission to and reception of signals from communication device 21b. Alternately, strip 75 might be an optical transmitter and receiver for transmission to and reception of signals from communication device 21b. Communication strip 75 is secured by a clip to a bracket 77 on the interior of sidewall 47.

As shown in FIG. 5, each of the rails 33 has one of the power bus bars 67 and one of the communication strips 75. Also, each dual-mode vehicle 11 has electrical devices 21 on both sides. Consequently, when vehicle 11 locates closer to one rail 33 than the other, the closer rail will assure power and communication between the vehicle and the guidance system through one set of electrical devices 21 even though the electrical devices 21 on the other side may have lost communication and power.

Referring again to FIG. 7, each rail 33 has a shroud 79 mounted to it. Shroud 79 is preferably of a weather resistant material, such as stainless steel. It has an upper portion 81 on an inner side that extends downwardly and inwardly. In the embodiment shown, it is located at an angle of about 20% relative to vertical, although this angle can vary. Upper inner sidewall 81 has a free edge that terminates about midway between track 53 and upper flange 43. Shroud 79 has a lower inner sidewall 83 that extends upward in a vertical plane. The upper free edge of lower inner sidewall 83 terminates somewhere below a midpoint between track 53 and upper flange 43 and also at an elevation lower than the free end of upper inner sidewall 81. This results in a slot or gap 85 that faces downward and inward for receiving the inclined portion of axle 19 located between hub in 19a and central portion 19b.

Shroud 79 also has a top wall 87, an outer sidewall 89, and a bottom wall 91. Top wall 87 overlies upper flange 43 and joins upper inner sidewall 81. Outer sidewall 89 is located in contact with the exterior side of channel member sidewall 47. Bottom wall 91 locates below lower flange 85 and joins lower inner sidewall 83.

Figure 6:
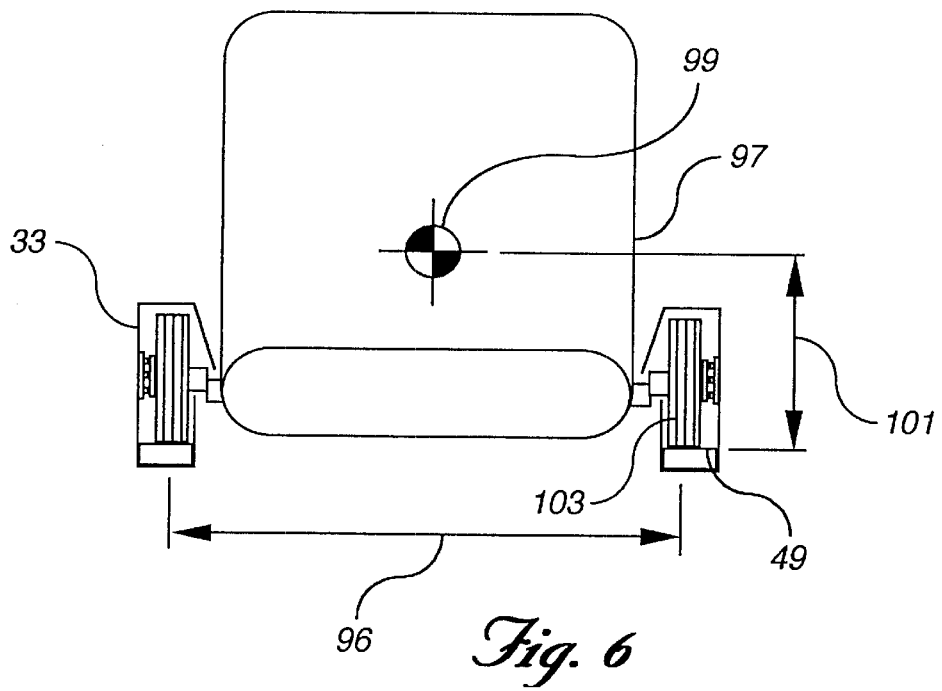
FIG. 6 is a schematic cross-sectional view of the guideway as shown in FIG. 5, but showing a cargo vehicle located on the guideway.

Referring again to FIG. 5, the offset axle 19 and enclosed shrouds 79 allow a low center of mass 99 to prevent tipping on curves. Center of mass 99 is located at a distance 95 from support member 49. Distance 95 is substantially less than track width 96. In FIG. 6, a freight vehicle 97 for use on the guideway is shown. Freight vehicle 97 has a higher center of mass 99 than dual-mode vehicle 11. However, even though higher, the distance 101 to support member 49 is considerably less than track width 96. Freight vehicle 97, similar to dual-mode vehicle 11, has wheels 101 that are received within enclosed rails 33.

Figure 12:
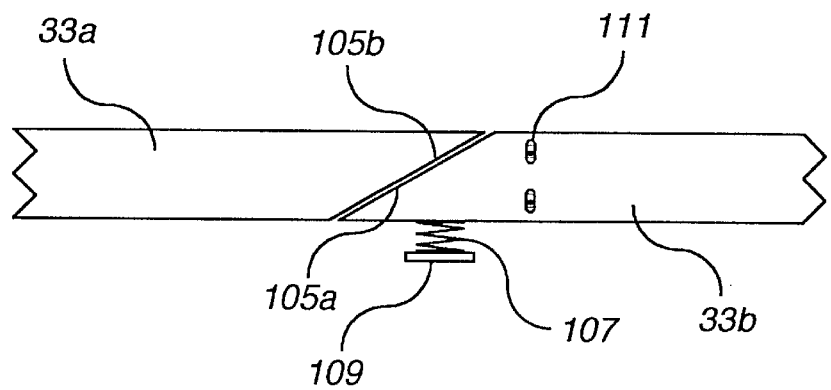
FIG. 12 is a top view of one of the rails of the guideway of FIG. 4, showing an end joint.

Referring to FIG. 12, rails 33 are constructed to accommodate thermal expansion. This is handled by constructing enclosed rails 33 in sections 33a, 33b. Sections 33a, 33b have diagonal or beveled ends 105a, 105b. Ends 105a, 105b are an acute angle relative to the longitudinal axis of rail 33. End 105b of rail 33b, is allowed to move laterally relative to the fixed end 105a of rail section 33a. Thermal expansion may cause the movable end 105b to slide relative to the fixed end 105a. A spring 107 urges movable end 105b of section 33b laterally into engagement with the fixed end 105a. Spring 107 is perpendicular to the longitudinal axis and is lodged against a stop plate 109. Slotted mounting holes 111 in rail section 33b near end 105b limit the amount of lateral movement that end 105b can make.

Figure 14:
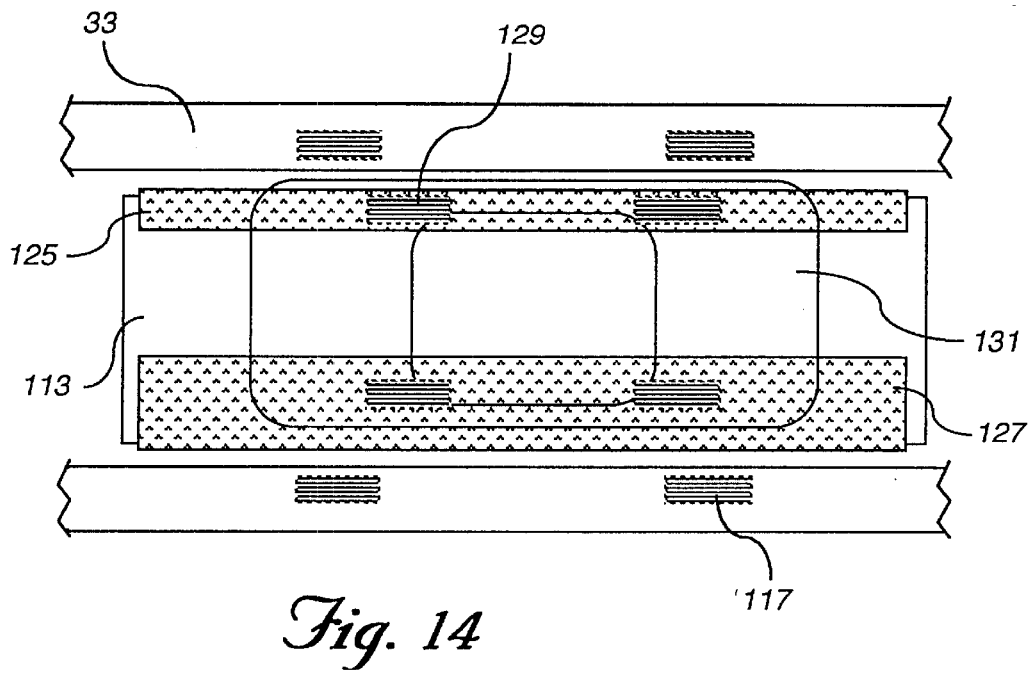
FIG. 14 is a top view of the guideway of FIG. 4, showing a ferry located thereon, with a motor vehicle load on the ferry.

In addition to dual-mode vehicles 11 (FIG. 1) and freight vehicles 97 that are meant only to run along the guideway, ferries 113, as shown in FIG. 14, operate on the guideway. Each ferry 113 is a flat platform having axles 115 (FIG. 15) and wheels 117. Axles 115 do not extend and retract because they are not meant to operate on conventional roadways. However, axles 115 do have offset ends and a lower central portion for extending through slot 85. Ferry 113 has an electrical motor 119, a braking system 121 and a controller 123. Controller 123 controls the speed of motor 119, preferably through a transmission, and also controls braking system 121 and a steering system. Signals from the guidance system will be received by controller 123 for operation along the guideway.

As shown in FIG. 14, ferry 113 has on its bed or frame one narrow channel or track 125 and one wider track 127. Each track 125, 127 is a channel member with upward facing flanges for receiving wheels 129 of a conventional motor vehicle 131. The width of channel member 125 is slightly greater than the width of the largest expected tire of a conventional motor vehicle wheel 129. There are a wide variety of widths of tires for wheels 129, and track 125 will be set to accommodate the widest expected width. Track 127 is considerably wider than track 125, such as two to three times as wide. This accommodates different distances between the wheels 129 on one side and the wheels 129 on the other side of a conventional motor vehicle 131. Tracks 125, 127 assure alignment of motor vehicle 131 in a longitudinal direction.

Figure 10:
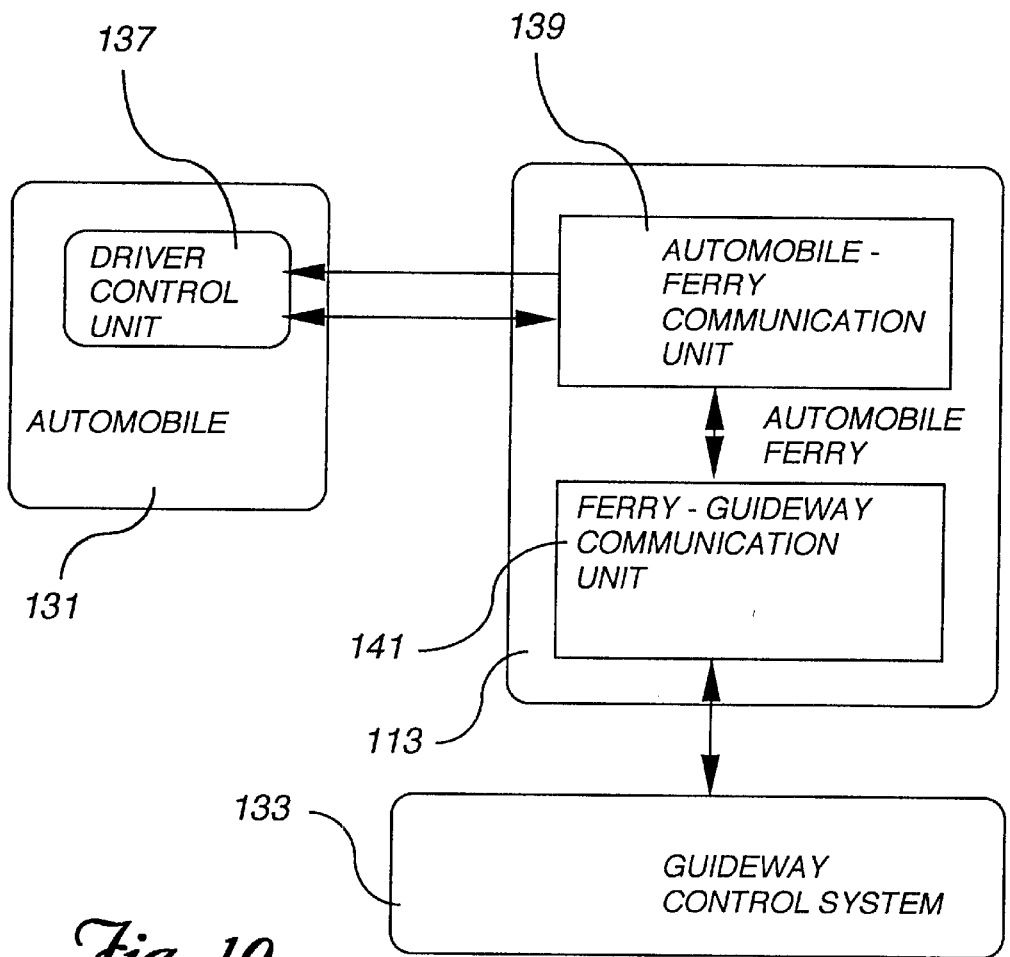
FIG. 10 is a schematic view illustrating electrical controls for the ferry used with the guideway of this invention and also illustrating controls for a conventional motor vehicle to be carried on the ferry.
Figure 11:
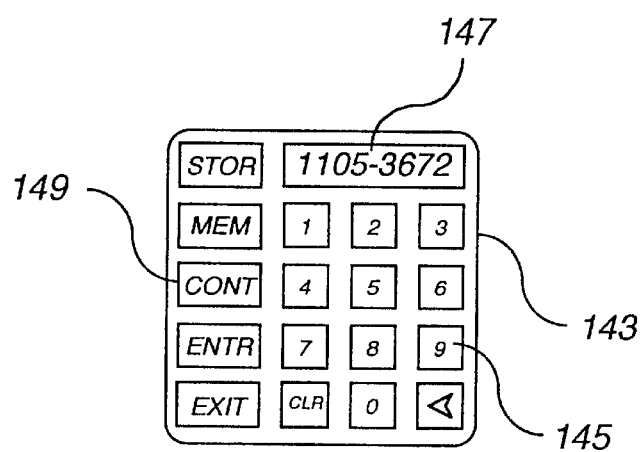
FIG. 11 illustrates a keypad that is a portion of the driver control unit of FIG. 10.

Referring again to FIG. 5, the guideway system has a guideway controller 133 that is connected to the signal cable 65 (FIG. 7) and in turn to communication strip 75. Similarly, a power supply 135 is connected to power cable 63 (FIG. 7) and in turn to conductors 68. Referring to FIG. 10, each conventional motor vehicle 131 will have a driver control unit 137 within the vehicle for communicating with guideway controller 133. Driver control unit 137 may be stationarily installed in motor vehicle 131 or portable. Driver control unit 137 will communicate with a communication unit 139 located on ferry 113, preferably by electro-optical or radio frequency signals. Communication unit 139 communicates with a ferry guideway communication unit 141 located on ferry 113. Ferry guideway communication unit 141 communicates with guideway control system 133 via electromagnetic or optical signals through communication device 75. This allows the driver of a conventional motor vehicle 131 to inform ferry 113 which station that the driver wishes to exit the automated guideway. FIG. 11 illustrates a keypad 143 that maybe a part of driver control unit 137. Keypad 143 preferably has alpha numeric keys 145 to input destination codes and a display 147. Furthermore, there may be function keys 149 for entering certain functions, such as entering or exiting. Keypad 143 may also be used in dual-mode vehicle 11 (FIG. 1)

Figure 8:
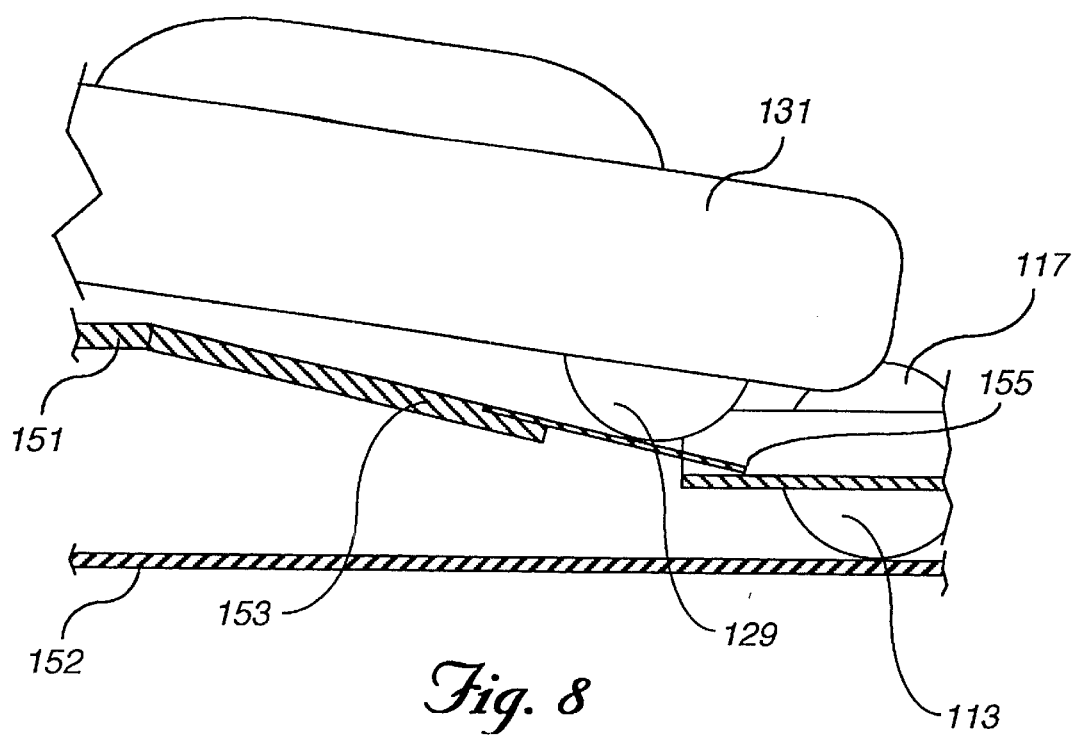
FIG. 8 is a side sectional view schematically illustrating a platform and ramp for loading conventional motor vehicles onto ferries for use on the guideway of FIG. 4.
Figure 9:
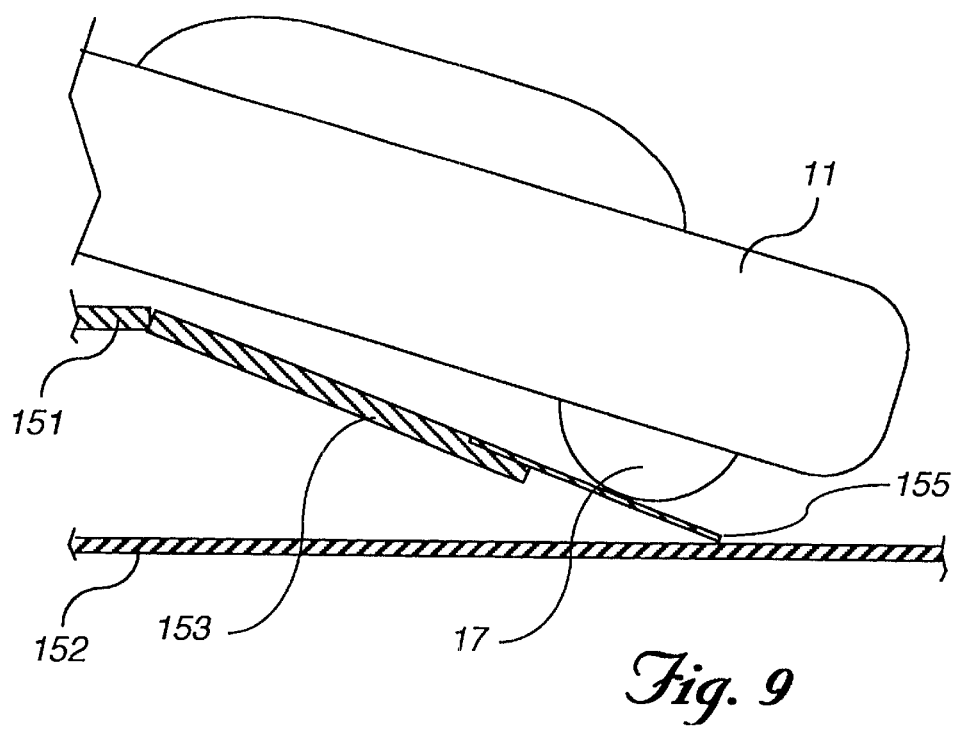
FIG. 9 is a view of the platform and ramp of FIG. 8, but showing a dual-mode vehicle being driven onto the guideway.

Referring to FIGS. 8 and 9, conventional motor vehicles 131 may be driven onto a ferry 113 from a platform 151. Platform 151 is located at an entrance to the guideway system, immediately in front the enclosed rails 33 (FIG. 3). Platform 151 is located at an elevation above an entrance track 152 leading into the enclosed rails 33. This distance is slightly greater than a distance from entrance track 152 to the tops of wheels 117 of ferry 113, so that ferry 113 can roll on entrance track 152 under platform 151. A ramp 153 is connected by a hinge to platform 151 for tilting between an upper ferry-loading position, and a lower dual-mode loading position. Ramp 153 has a free end 155 that will contact the bed of ferry 113 while motor vehicle 131 is being loaded as shown in FIG. 8. As the ferry 133 moves away after loading, free end 155 will tilt downward to the dual-mode loading position shown in FIG. 9. It will remain in this lower position unless another ferry 113 comes along, in which case the incoming ferry 113 will push the ramp 153 back upward to the upper position for receiving another conventional motor vehicle 131.

If a dual-mode vehicle is to be loaded as shown in FIG. 9, ramp 153 must be in the lower position. Ramp 153 is preferably in the lower position normally, and in the upper position only while loading a conventional vehicle 131 onto a ferry 133. In the lower position, free end 155 is lowered to the entrance track 152 leading to the enclosed rails 33 (FIG. 3). Prior to leaving platform 151, dual-mode vehicle 11 will move its wheels 17 to the expanded position for entering the enclosed rails 33. Platform 151 is used for both conventional motor vehicles 131 and dual-mode vehicles 11.

Figure 13:
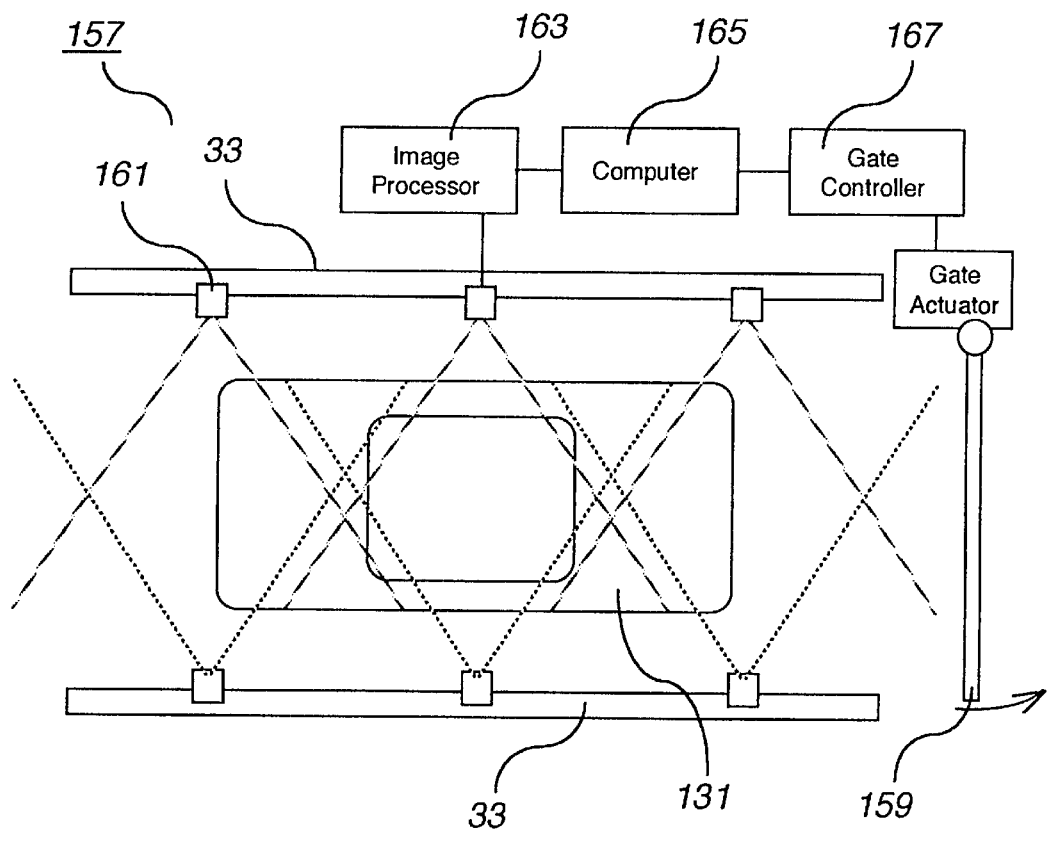
FIG. 13 is the schematic view of an inspection station for the guideway of FIG. 4.

Referring to FIG. 13, an inspection station 157 is shown prior to an entrance gate 159. Entrance gate 159, when opened, allows a conventional motor vehicle 131 or a dual-mode vehicle 11 to pass to enter the guideway. Electronic video cameras 161 are placed on both sides of inspection station 157. Video cameras 161 will record the external shape of motor vehicle 131 or of a dual mode vehicle 11 (FIG. 1). The images will be processed by an image processor 163. A computer 165 having a data base will compare the images to those in the data base to make sure that the vehicle 131 is capable of being driven onto the guideway. Computer 165 controls a gate controller 167 which opens and closes gate 159.

Figure 15:
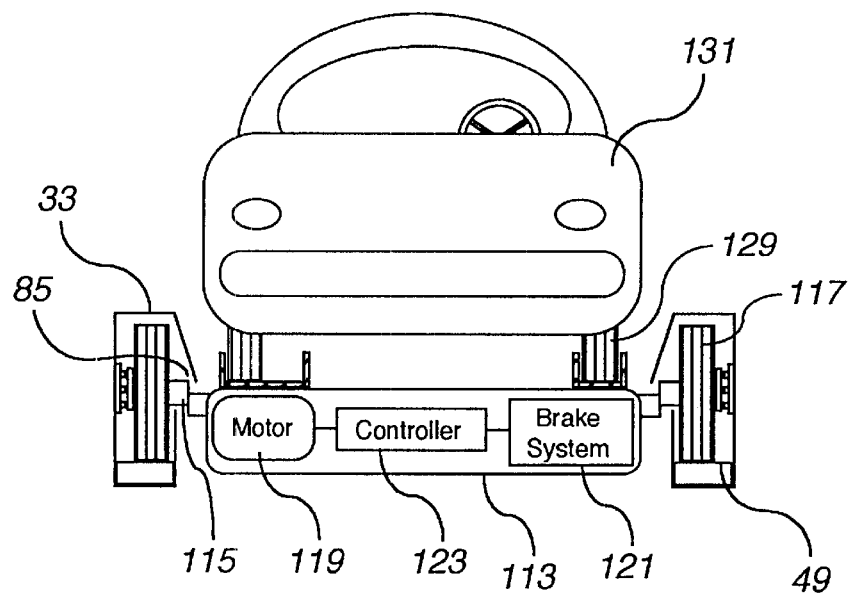
FIG. 15 is a schematic front view of the ferry and motor vehicle of FIG. 14.
Figure 16:
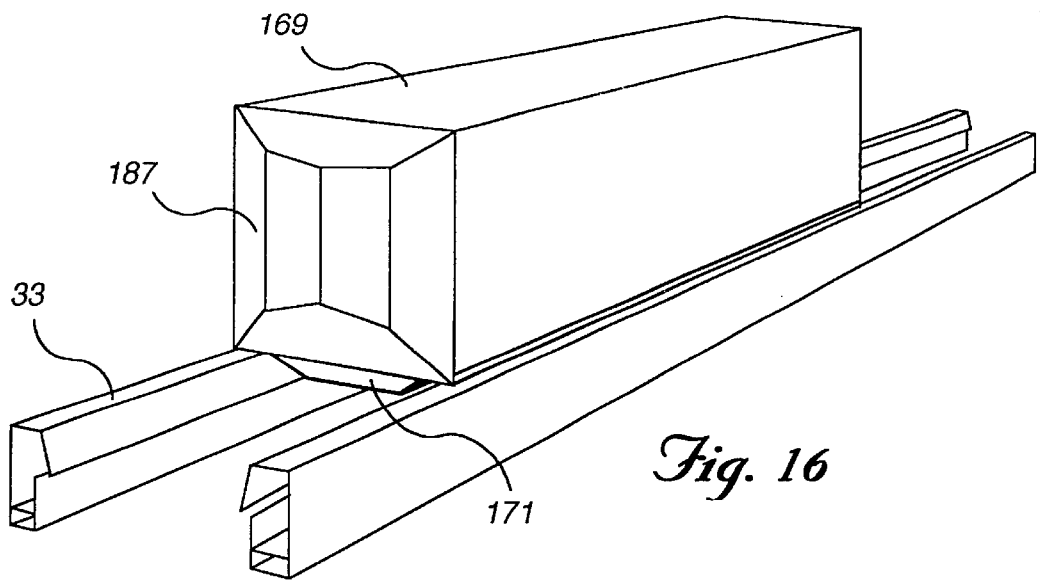
FIG. 16 is a perspective view of a sea-land cargo container being carried on a ferry on the guideway of this invention.
Figure 17:
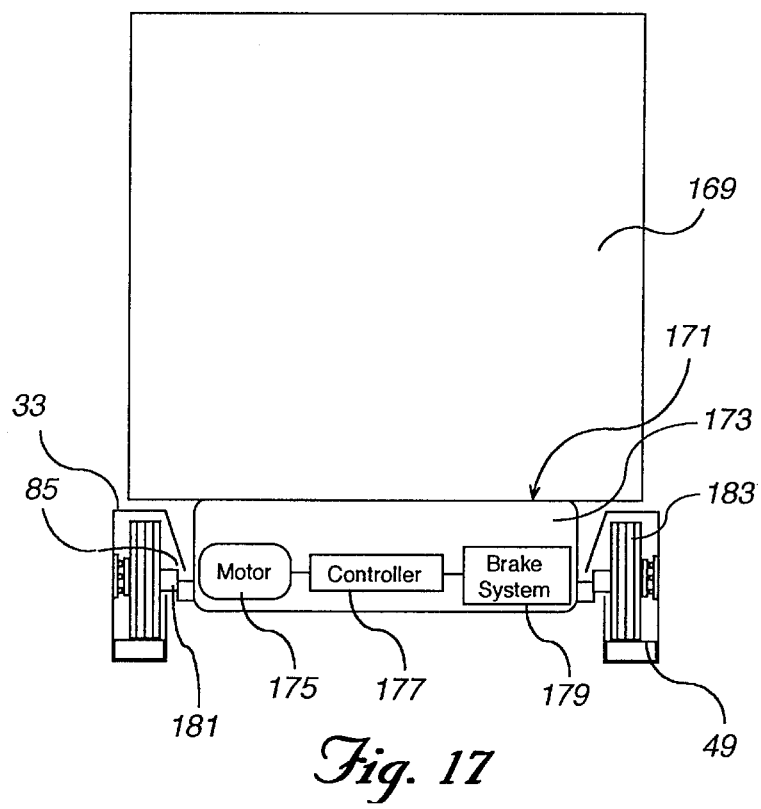
FIG. 17 is a schematic sectional view of the cargo container, ferry, and guideway of FIG. 16.

Referring to FIGS. 16–20, a cargo container 169 is shown being carried on the guideway. Cargo container 169 is a conventional sea-land container such as carried on ships, railcars, and truck trailers. In this invention, cargo container 169 is carried on a ferry 171, which is similar to motor vehicle ferry 113 (FIGS. 14 and 15). As shown in FIG. 17, ferry 171 has a frame or bed 173 onto which container 169 is loaded. Ferry 171 is powered by an electrical motor 175 that is controlled by a controller 177. Ferry 171 also has a brake system 179 controlled by controller 177. Ferry 171 has at least two axles 181, each having wheels 183 that roll on support members 49 within enclosed rails 33. Axles 181 are offset for passing through slot 85. Ferry 171 also has power and communication devices that receive power and control signals in the same manner as ferry 113 of FIG. 15.

Figure 18:
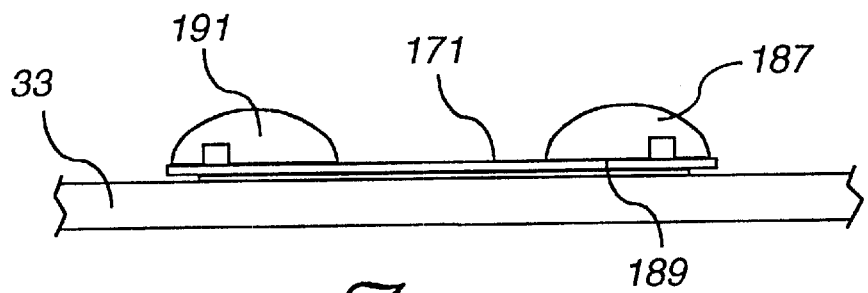
FIG. 18 is a side view of the cargo ferry of FIG. 16, with the container removed and wind resistance reducing end caps in a storage position.
Figure 19:
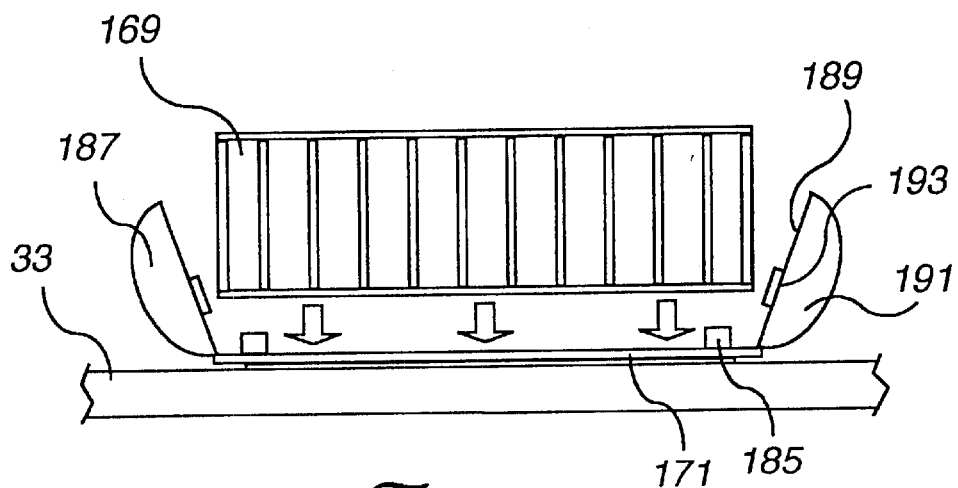
FIG. 19 is a view of the cargo container of FIG. 16 being loaded on the ferry.
Figure 20:
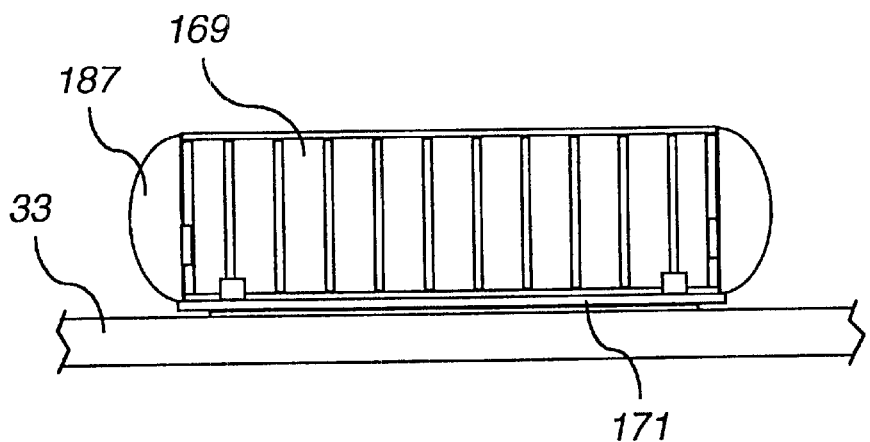
FIG. 20 is a side view of the cargo container of FIG. 16 shown in a loaded position.

Latches 185 (FIG. 19) are mounted to frame 173 near each end for releasably securing cargo container 169. Latches 185 may be of a variety of types, including types that secure sea-land containers to railcars or truck trailers. Also, end caps 187 are located at each end for reducing wind resistance. Each end cap 187 is connected to frame 173 by a hinge that allows movement between a storage position (FIG. 18), a loading position (FIG. 19) and an operational position (FIG. 20). Each end cap 187 has an inner side 189, which may be flat or hollow, and an outer side 191 that is generally convex and aerodynamically contoured. The outer side 191 may be smoothly curved, as shown in FIGS. 18–20 or it may be made up of several flat portions arranged in a generally convex shape as shown in FIG. 16.

The storage position is employed while no container is located on ferry 171. In this position, inner side 189 faces downward and lies against frame 173. For loading, end caps 187 tilt outward to allow a crane (not shown) to lower container 169 onto frame 173. In the operational position, end caps 187 locate upright, with inner side 189 abutting one of the ends of container 169. A latch 193 maybe employed on each end cap 187 to latch end caps 187 to container 169 in the operational position. In the operational position, convex sides 191 face in opposite directions, with one facing forward and the other rearward. The one facing forward serves to reduce wind resistance of the container 169. The one facing rearward will do the same when ferry 171 is running in the opposite direction. Preferably, while in the upright operational position, the height of each end cap 187 is substantially the same as the height of container 169.

In the operation with dual-mode vehicle 11, as shown in FIG. 1, the driver will drive the vehicle to inspection station 157 (FIG. 13). Its image will be recorded, compared to those in a database, then gate 159 will be opened. The operator drives vehicle 11 onto platform 151 and extends wheels 17 and power and communication devices 21 to the position shown in FIG. 2. Ramp 153 will normally be in the lower position, allowing the dual-mode vehicle 11 to drive onto entrance track 152 leading into enclosed rails 33 (FIG. 3). The operator then drives into the enclosed rails 33, with wheels 17 driving on the support members 49 as illustrated in FIG. 3.

Once in enclosed rails 33, guideway controller 133 and power supply 135 will communicate with the electrical devices 21 of dual-mode vehicle 11, as shown in FIG. 5. Guideway controller 133 will signal vehicle controller 137 to disengage batteries 25. Power will be supplied by the external power supply 135, flowing through conductors 68 and 21a. (FIG. 7). Signals will be provided either optically or electromagnetically through communication devices 75, 21b. The driver will input his destination via keypad 143. Guideway controller 133 will control the speed, braking and steering as dual-mode vehicle 11 proceeds to its destination. At the destination, dual-mode vehicle 11 will proceed out of the enclosed rails 33. Wheels 17 will be retracted to the position shown in FIG. 1. The operator will operate vehicle 11 on conventional roadways with its storage battery 25 driving its electrical motor 23.

During operation with conventional motor vehicles, motor vehicle 131 will proceed to inspection station 157 (FIG. 13) for being electronically scanned by video cameras 161. The images will be processed by processor 163 and compared to a database in computer 165. If the vehicle 131 matches the requirements, gate controller 167 will open gate 159, allowing vehicle 131 to proceed. The guideway controller 133 will cause a ferry 113 to pass beneath platform 151 and push ramp 153 up to the ferry loading position shown in FIG. 8. Vehicle 131 moves along platform 151 and down ramp 153 onto the bed of ferry 113.

The driver in conventional motor vehicle 131 will provide information through keypad 143 and driver control unit 137 (FIGS. 10 and 11) to the motor vehicle ferry communication unit 139. This informs ferry 113 of the destination of motor vehicle 131. Communication unit 139 communicates with the ferry guideway communication unit 141, which in turn communicates with the guideway control system 133. The latter communication is handled through the same communication device 75 (FIG. 7) that is used with dual-mode vehicles 11. Electrical power is supplied through conductors 68 (FIG. 7) to mating conductors on ferry 113. Ferry 113 will proceed to the designated exit. The driver drives conventional motor vehicle 131 off of ferry 113, operating the conventional vehicle 131 on conventional streets.

In the operation of cargo ferry 171 of FIGS. 16–20, end caps 187 will be tilted outward and a cargo container 169 filled with freight will be lowered onto frame 173. End caps 187 are then moved upright and secured in place as shown in FIG. 20. One of the end caps 187 will serve to reduce wind resistance. To unload, end caps 187 are tilted outward as shown in FIG. 19. For storage, end caps 187 are preferably lowered to the position of FIG. 18.

The invention has significant advantages. The shrouds for the enclosed rails reduce operational problems due to rain, snow, ice and sleet. All active elements of the guideway and active elements of the vehicles are fully protected from weather elements, while providing a guideway suitable for dual-mode vehicles as well as dedicated vehicles. The extensible wheel assemblies allow an electric vehicle to be driven both on its own power on a conventional road and under automatic control on guideway supplied power.

The ferry system invention has several advantages. This system allows transportation of conventional motor vehicles and their contained passengers under automatic control to desired destinations selected by the motor vehicle driver. The ferry vehicle operates under automated control to move the ferry and its load from the loading point to the selected exit point. The ferry vehicle operates from electrical power supplied by power bus bars in the enclosed rail. Motor vehicles may be loaded and unloaded easily and quickly. Conventional sea-land cargo containers maybe loaded on cargo ferries. The end caps reduce wind resistance.

Although only the preferred embodiments of devices for carrying out the invention have been disclosed above, it is not to be construed that the invention is limited to such embodiments. Other modifications may be made by those skilled in the art without departing from the scope of the invention.

I claim:

1. An electrically powered transportation system, comprising:

a guideway with parallel rails that extend longitudinally, each of the rails having an upright side wall, a top wall, a wheel engaging surface located inward from the side wall and below the top wall, and an inner wall having a longitudinally extending slot;

an electrical bus bar extending along at least one of the rails;

an electrically powered ferry having a frame onto which cargo may be loaded and a set of wheels mounted on axles, the axles having end portions that extend through the slot, with the wheels being located between the inner and outer walls on the wheel engaging surface;

an electrical contact on the ferry that engages the electrical bus bar for delivering power to the ferry;

a dual mode vehicle having an electrical motor, a set of wheels that roll on the wheel engaging surface, and an electrical contact for engaging the electrical bus bar for receiving power to drive the electrical motor, the dual mode vehicle being capable of operating on conventional roads as well as on the guideway; and wherein the ramp of the loading platform has a guideway loading position in which the free end of the ramp is at an elevation even with the wheel engaging surface for allowing the dual mode vehicle to enter the guideway.

2. An electrically powered transportation system, comprising:

a guideway with parallel rails that extend longitudinally, each of the rails having an upright side wall, a top wall, a wheel engaging surface located inward from the side wall and below the top wall, and an inner wall having a longitudinally extending slot;

an electrical bus bar extending along at least one of the rails;

an electrically powered ferry having a frame onto which cargo may be loaded and a set of wheels mounted on axles, the axles having end portions that extend through the slot, with the wheels being located between the inner and outer walls on the wheel engaging surface;

an electrical contact on the ferry that engages the electrical bus bar for delivering power to the ferry; and a loading platform extending over the guideway at an elevation sufficient to allow the ferry moving along the guideway to pass beneath the platform, the loading platform having a hinged ramp on one end that is tiltable between an upper position, wherein a free end of the ramp is located above the ferry on the guideway beneath the ramp, and a ferry loading position with the free end in contact with the frame of the ferry to allow a motor vehicle to be driven onto the frame of the ferry as cargo.

3. An electrically powered transportation system, comprising:

a guideway with parallel rails that extend longitudinally, each of the rails having an upright outer side wall, a top wall, a wheel engaging surface located inward from the outer side wall and below the top wall, and an inner side wall having upper and lower portions with a longitudinally extending slot between the upper and lower portions;

an electrical bus bar mounted to an interior side of one of the side walls and extending along at least one of the rails;

an electrically powered ferry having a frame onto which cargo may be loaded and a set of wheels mounted on axles, the axles having end portions that extend through the slot, with the wheels being located between the inner and outer side walls on the wheel engaging surface; and an electrical contact on the ferry that engages the electrical bus bar for delivering power to the ferry.

4. The transportation system according to claim 3, wherein the ferry has an electrical motor, a brake system, and a ferry controller for controlling the speed of the motor and the braking system; and wherein the system further comprises:

a communications controller adapted to be carried within a motor vehicle when the motor vehicle is cargo on the ferry, the communications controller adapted to be manually actuable by a driver of the motor vehicle while the ferry is moving for sending signals from the communications controller to the ferry controller.

5. The transportation system according to claim 3, further comprising:

a pair of upward facing fixed-width channels locating on the frame of the ferry for receiving the wheels of a motor vehicle when a motor vehicle comprises cargo on the ferry, the width of one of the channels being greater than the other for receiving motor vehicles having different wheel widths.

6. The transportation system according to claim 3, further comprising:

an entry gate leading to the guideway for selectively admitting motor vehicles for transport on the guideway as cargo on the ferry; and an inspection station at the entry gate, having video cameras adapted to record images of the motor vehicles, and a computer having a database for comparing the images with data stored in the database to admit and deny entrance to the guideway by controlling the entry gate.

7. The transport system according to claim 3, wherein the frame of the ferry has a latch for releasably securing a rectangular container to the frame as cargo.

8. The transport system according to claim 7, further comprising:

at least one end cap that is secured by a hinge to one end of the frame of the ferry, allowing movement between a storage position, a loading position, and an operational position;

the end cap having an inner side and a convex aerodynamic surface on an outer side; and wherein while in the storage position the end cap folds onto the frame with the inner side facing downward and the outer side facing upward;

while in the loading position, the end cap tilts outward from the frame to allow a container to be loaded on the frame as cargo; and while in the operational position, the inner side is adapted to contact an end of the container, and the outer side is adapted to face away from the container.

9. An electrically powered transport system, comprising:

a guideway with parallel rails that extend longitudinally;

an electrical bus bar extending along the guideway;

an electrically powered ferry having a frame onto which cargo may be loaded and a set of wheels that roll on the rails;

an electrical contact on the ferry that engages the electrical bus bar for delivering power to the ferry; and a loading platform extending over the guideway at an elevation sufficient to allow the ferry moving along the guideway to pass beneath the platform, the loading platform having a hinged ramp on one end that is tiltable between an upper position, wherein a free end of the ramp is located above the ferry on the guideway beneath the ramp, and a ferry loading position with the free end in contact with the frame of the ferry to allow a motor vehicle to be driven onto the frame of the ferry as cargo.

10. The transport system according to claim 9, wherein the hinged ramp also has a guideway loading position wherein the hinged ramp extends downward into contact with the rails to enable a dual mode vehicle to be driven from the ramp directly onto the rails, the dual mode vehicle being capable of being driven on conventional roads as well as the rails.

* * * * *